United States Patent
Kropp et al.

(10) Patent No.: US 6,699,133 B2
(45) Date of Patent: Mar. 2, 2004

(54) ANNULAR DISK FOR FLEXIBLE SHAFT COUPLINGS, DISK PACKET MADE FROM THESE ANNULAR DISKS, AND FLEXIBLE SHAFT COUPLING WITH SUCH ANNULAR DISKS

(75) Inventors: Michael Kropp, Stadtlohn (DE); Patrice Millet, Vreden (DE)

(73) Assignee: ATEC-Weiss GmbH & Co. KG, Vreden (DE)

( * ) Notice: Subject to any disclaimer, the term of this patent is extended or adjusted under 35 U.S.C. 154(b) by 0 days.

(21) Appl. No.: 10/370,371

(22) Filed: Feb. 19, 2003

(65) Prior Publication Data

US 2003/0125115 A1 Jul. 3, 2003

Related U.S. Application Data

(62) Division of application No. 09/829,350, filed on Apr. 9, 2001, now Pat. No. 6,547,666.

(51) Int. Cl.$^7$ ............................................. F16D 3/79
(52) U.S. Cl. .......................................................... 464/99
(58) Field of Search .............................. 464/93, 94, 95, 464/98, 99; 267/161, 162; 277/591; F16D 3/79

(56) References Cited

U.S. PATENT DOCUMENTS

| | | |
|---|---|---|
| 1,455,242 A | 5/1923 | Corgiat, Jr. et al. |
| 4,450,800 A | 5/1984 | Kotauschek ............ 277/591 X |

FOREIGN PATENT DOCUMENTS

| | | |
|---|---|---|
| GB | 2 153 044 A | 8/1985 |
| GB | 2 192 969 A | 1/1988 |
| JP | 8-284971 | 11/1996 |

OTHER PUBLICATIONS

Mancuso, J. R.,Couplings and Joints, New York, Marcel Dekker, Inc., 1999, p. 463, TJ183.M36 1999.

Primary Examiner—Greg Binda
(74) Attorney, Agent, or Firm—Collard & Roe, P.C.

(57) ABSTRACT

An annular disk for flexible shaft couplings is described, whose two coupling halves each exhibiting a connection flange are connected to each other via a packet of such annular disks in a torsionally rigid manner, but in such a way as to enable their axial and angular movement. The annular disk has four attachment holes uniformly distributed on a shared hole circle, wherein the section is tapered between two adjacent attachment holes. The annular disk according to the invention satisfies the following size ratios:

$Dt/D1$=10 to 12, $D2/Dt$=1.1 to 1.2, $Dt/B1$=9 to 16, and $B2/Dt$=0.88 to 0.93, wherein Dt is the diameter of the hole circle, D1 is the diameter of the respective attachment hole, D2 is the largest outside diameter of the annular disk, B1 is the width of the narrowest part of the annular disk section between two consecutive attachment holes, and B2 is the width of the annular disk outer contour. The annular disk according to the invention makes it possible to offset relatively large dislocations.

16 Claims, 4 Drawing Sheets

ANNULAR DISK FOR FLEXIBLE SHAFT COUPLINGS, DISK PACKET MADE FROM THESE ANNULAR DISKS, AND FLEXIBLE SHAFT COUPLING WITH SUCH ANNULAR DISKS

This is a divisional of application Ser. No. 09/829,350 filed on Apr. 9, 2001 now U.S. Pat. No. 6,547,666.

BACKGROUND OF THE INVENTION

1. Field of the Invention

The invention relates to an annular disk for flexible shaft couplings, whose two coupling halves each exhibiting a connection flange are connected to each other via a packet of such annular disks in a torsionally rigid manner, but in such a way as to enable their axial and angular movement, wherein the disk packet is alternatingly secured to both connection flanges via circumferentially distributed attachment and clamping means, and wherein the annular disk has four attachment holes uniformly distributed on a shared hole circle, and the width of the annular disk section tapers between two consecutive attachment holes. The invention also relates to a disk packet made out of such annular disks, and a flexible shaft coupling with such annular disks.

2. Description of the Related Art

Couplings of this kind are known in the art, and have proven themselves in practice. They make it possible to offset both an axial and angular displacement of the shafts to be connected to each other. In addition, a radial displacement can also be offset if two such couplings are connected in series with the use of a so-called intermediate sleeve.

SUMMARY OF THE INVENTION

The object of the invention is to provide an annular disk of the kind mentioned at the outset that enables a higher axial displacement offset and higher angular displacement offset than conventional annular disks of this type while still having a high breaking strength. In particular, the object of the invention is to provide a disk packet or flexible shaft coupling for correspondingly large dislocations.

This object is essentially achieved according to the invention by having the annular disk satisfy the following geometric size rations:

$Dt/D1=10$ to 12, $D2/Dt=1.1$ to 1.2, $Dt/B1=9$ to 16, and $B2/Dt=0.88$ to 0.93, wherein Dt is the diameter of the hole circle, D1 is the diameter of the respective attachment hole, D2 is the largest outside diameter of the annular disk, B1 is the width of the narrowest part of the annular disk section between two consecutive attachment holes, and B2 is the width of the annular disk outer contour.

Tests have shown that shaft couplings with annular disks according to the invention can offset higher dislocations than conventional shaft couplings of this type at the same operational reliability.

Outstanding results were here achieved when the ratio of the hole circle diameter Dt to the smallest internal diameter D3 of the annular disk according to the invention ranged between 1.5 and 1.65.

It is also advantageous for the thickness of the individual annular disks to range between 0.2 and 0.4 mm. Chromium-nickel-steel, in particular X12CrNi 17 7, is preferred as the material for the annular disks.

Another advantageous embodiment of the invention relates to a disk packet comprised of annular disks according to the invention, in which plain washers with fretting corrosion-reducing surfaces are arranged between the individual annular disks or between packets comprised of several annular disks. This additionally improves the operational reliability of a correspondingly constructed shaft coupling. In another preferred embodiment, the plain washers can consist in particular of plastic, or have a sliding coating. Teflon® can preferably be used as the plastic or sliding coating.

Additional preferred and advantageous embodiments of the invention are described in the subclaims.

BRIEF DESCRIPTION OF THE DRAWINGS

The invention will be described in greater detail below based on a drawing that shows several embodiments. Shown on.

DESCRIPTION OF THE PREFERRED EMBODIMENTS

Figure 1:
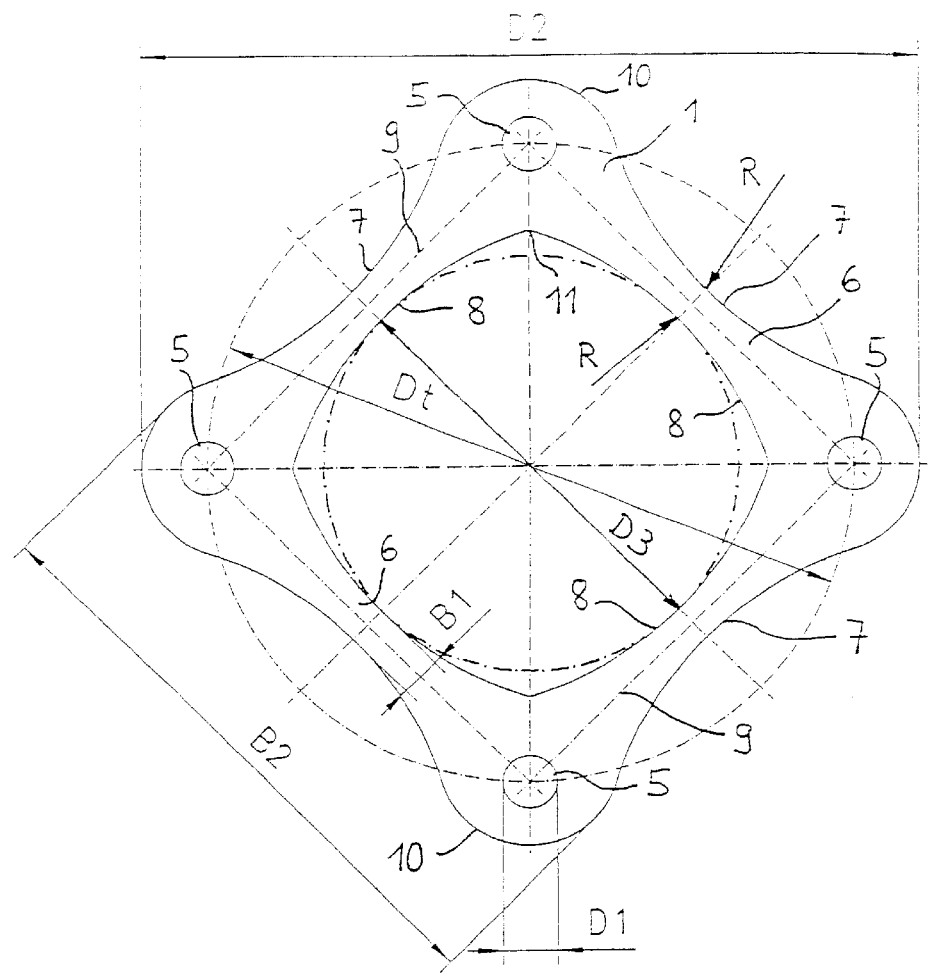
FIG. 1 is a top view of an annular disk according to the invention.

The annular disk 1 shown on the drawing is symmetrically designed, and intended for flexible shaft couplings, both coupling halves of which each exhibit a connection flange, and are connected to each other in a torsionally rigid manner, but in such a way as to enable their axial and angular movement, wherein the disk packet is alternatingly secured to both connection flanges via circumferentially distributed attachment and clamping means 2, 3.

The annular disk 1 is essentially rectangular in shape, and provided with four attachment holes 5, which are uniformly distributed on a common hole circle, and each have the same diameter D1 (compare FIG. 1). The diameter of the hole circle is marked Dt.

The annular disk section 6 lying between two adjacent attachment holes 5 has a concave outer contour 7 and a concave inner contour 8. Therefore, the respective annular disk section has a taper, whose narrowest part lies in the middle between two adjacent attachment holes 5. The width of the narrowest part is marked B1. The outer contour 7 and inner contour 8 of the tapered disk sections 6 each have a circular arc design, wherein both circular arcs have the same radius R. The attachment holes 5 are-arranged in such a way that the connecting line 9 defined by the midpoints of two consecutive attachment holes 5 runs centrally between the concave outer contour 7 and concave inner contour 8 of the taper. The smallest inside diameter of the annular disk 1 as defined by the narrowest parts of two diametrically opposed tapers is marked D3.

At the attachment holes 5, the annular disk 1 has a convex outer contour section 10 having a circular arc design, which continuously connects two adjacent, concave outer contour sections 7. Groove sections 11 having a circular arc profile with a relatively small radius are formed between the concave inner contour sections 8. The width of the annular disk outer contour is denoted with B2 on FIG. 1.

The disk thickness preferably measures 0.2 to 0.4 mm. Chromium-nickel-steel is preferred as the disk material, in particular X12CrNi 17 7.

The geometric size ratios of the depicted annular disk 1 can be varied in certain areas. To achieve optimal flexibility while maintaining a high breaking strength, the following size ratios were found to be advantageous:

$Dt/D1$=10 to 12, $D2/Dt$=1.1 to 1.2, $Dt/B1$=9 to 16, $B2/Dt$=0.88 to 0.93, and $Dt/D3$=1.5 to 1.65

Figure 2:
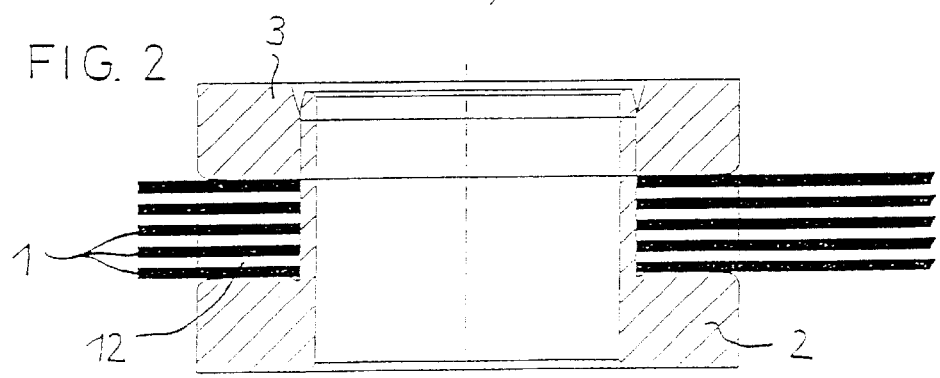
FIG. 2 is a magnified side view of the attachment point of a disk packet comprised of annular disks according to FIG. 1 and sandwiched plain washers.

The disk packet comprised of several annular disks 1 is alternatingly screwed to the connection flanges of the coupling halves of a shaft coupling (not shown) by means of clamping bolt (not shown) and clamping bushings 2 with axially slipped-on clamping rings 3 (compare FIG. 2). Plain washers 12 with fretting corrosion-reducing surfaces are arranged between the annular disks 1. The plain washers 12 essentially have the same outside diameter as the clamping ring 3 and collar of the clamping bushing 2. The plain washers 12 can preferably consist of plastic, or have a sliding coating made out of plastic. In particular polytetrafluoroethylene plastic is suitable as the plastic to this end.

To offset a radial displacement, the coupling can be provided with an intermediate ring or intermediate sleeve and another corresponding disk packet.

Figure 3:
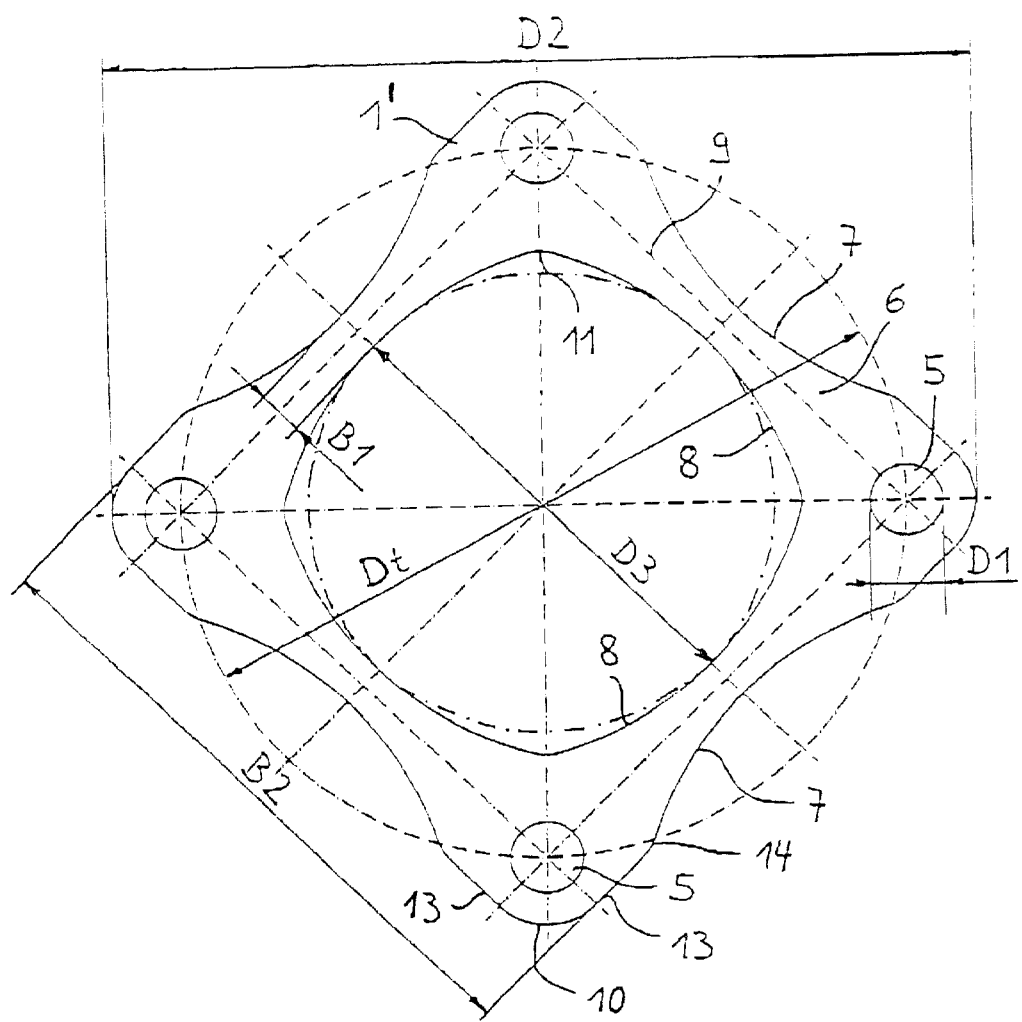
FIG. 3 is a top view of a second embodiment of an annular disk according to the invention.
Figure 4:
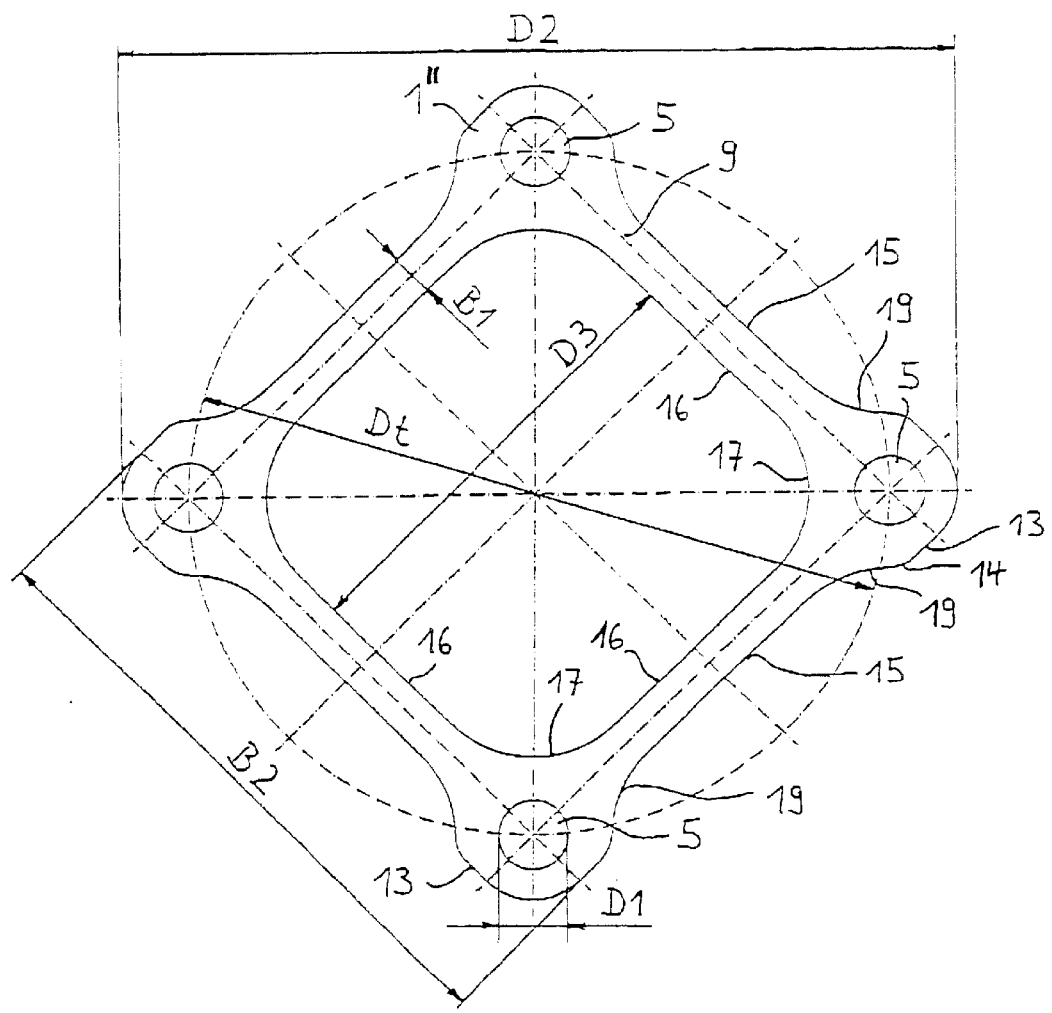
FIG. 4 is a top view of a third embodiment of an annular disk according to the invention.
Figure 5:
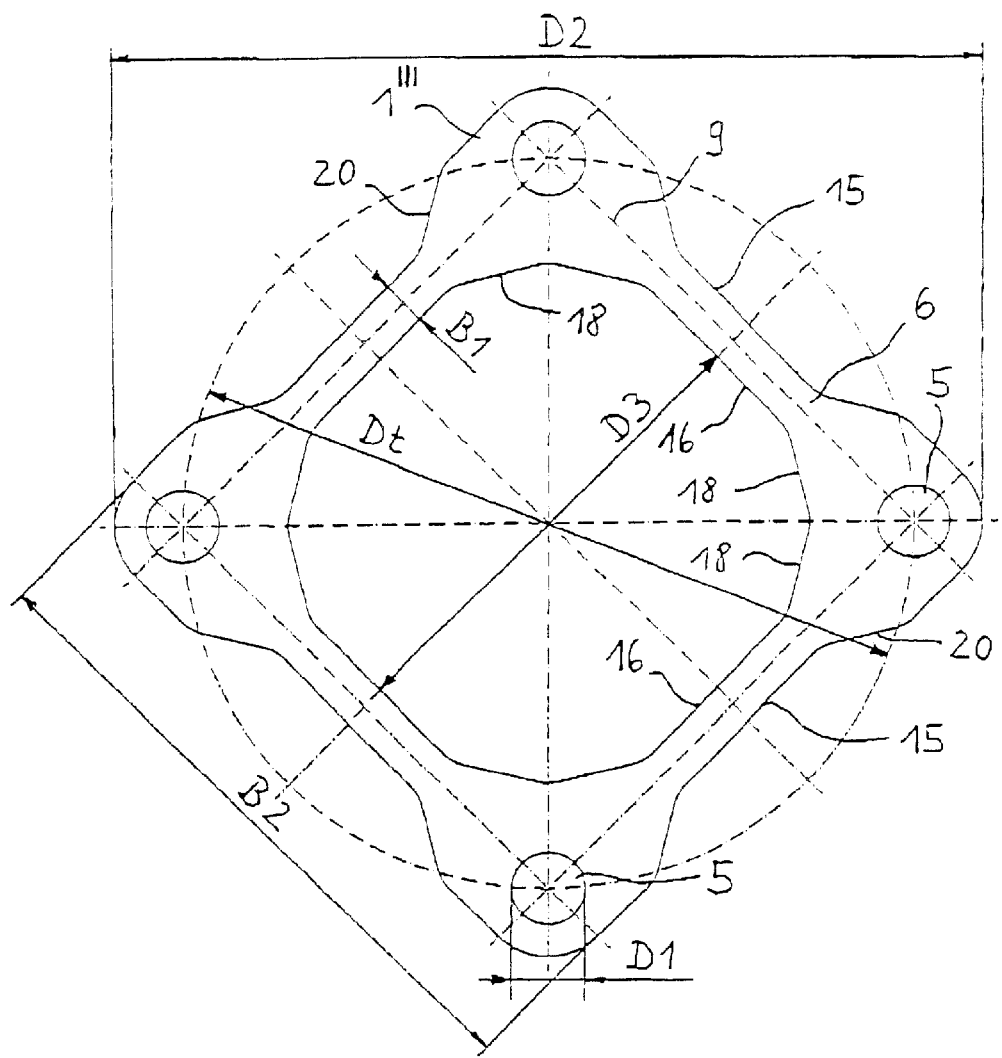
FIG. 5 is a top view of a fourth embodiment of an annular disk according to the invention.

FIGS. 3 to 5 show additional embodiments of an annular disk 1 according to the invention. Essentially, the annular disk 1' shown on FIG. 3 differs from the annular disk according to FIG. 1 in that two basically straight outer contour sections 24 are formed on the attachment holes 5, situated basically at a right angle to each other, and connected with each other by a convex outer contour section 10 having a circular arc profile. The concave outer contour sections 7, which together with the correspondingly designed inner contour sections 8 define the tapers, are continuously connected with the linear outer contour sections 13 via rounded sections 14.

The annular disks 1" and 1''' shown on FIGS. 4 and 5 differ from the annular disks on FIGS. 1 and 3 in that the respective taper between two adjacent attachment holes 5 is defined by a recess with a central, straight outer contour section 15 and an inner contour section 16 running parallel thereto. In the annular disk according to FIG. 4, the straight inner contour sections 16 are continuously connected with each other via groove sections 17 having a circular arc profile, while the straight inner contour sections 16 of the annular disk according to FIG. 5 are each connected with the next straight inner contour section 16 defining the narrowest part of the taper via two also straight, but angled inner contour sections 18. The transitions between the individual straight inner contour sections 16 and 18 of the annular disk according to FIG. 5 are each rounded, and hence have a continuous design. The recesses in the outer contour of the respective annular disk according to FIG. 4 and FIG. 5 are shaped according to the respective inner contour. The straight outer contour section 15 of the annular disk according to FIG. 4 first goes over into an outer contour section 19 having a circular arc profile in the direction of the attachment holes 5, which in turn goes over to the relatively short straight section 13 on the attachment hole 5 via a convex, rounded outer contour section 14. The sections 17 and 19 have the same circular arc radius. FIG. 5 shows that corresponding straight outer contour sections 20 are allocated to the straight inner contour sections 18 situated in the area of the attachment holes 5, and are essentially angled by the same amount relative to the respective middle, straight outer contour section 15 as the inner contour sections 18 relative to the middle inner contour sections 16 defining the taper.

What is claimed is:

1. An annular disk for flexible shaft couplings, whose two coupling halves, each having a connection flange, are connected to each other via a packet of said annular disks in a torsionally rigid manner, but in such a way as to enable their axial and angular movement, wherein the disk packet is alternatingly secured to both connection flanges via circumferentially distributed attachment and clamping means, and wherein said annular disk has four attachment holes uniformly distributed on a common hole circle, and the width of said annular disk tapers between two consecutive attachment holes, wherein the taper between two adjacent attachment holes is defined by a recess with a central, straight outer contour section and an inner contour section running parallel thereto, wherein said inner contour sections are continuously connected with each other via groove sections having a circular arc profile, while said straight outer contour sections pass over into outer contour sections also having a circular arc profile, and wherein said circular arc profiles have the same circular arc radius, characterized by the fact that the annular disk satisfies the following size ratios:

$Dt/D1$=10 to 12, $D2/Dt$=1.1 to 1.2, $Dt/B1$=9 to 16, and $B2/Dt$=0.88 to 0.93, wherein Dt is a diameter of said hole circle, D1 is a diameter of the respective attachment hole, D2 is a largest outside diameter of said annular disk, B1 is a width of a narrowest part of said annular disk section between two consecutive attachment holes, and B2 is a width of said annular disk outer contour.

2. A disk packet according to claim 1, wherein plain washers are arranged between individual annular disks or between packets comprised of several annular disks.

3. A disk packet according to claim 2, wherein said plain washers consist of plastic, or have a plastic coating.

4. A disk packet according to claim 2, wherein said plain washers consist of polytetrafluoroethylene, or have a coating made out of polytetrafluoroethylene.

5. An annular disk for flexible shaft couplings, whose two coupling halves, each having a connection flange, are connected to each other via a packet of said annular disks in a torsionally rigid manner, but in such a way as to enable their axial and angular movement, wherein the disk packet is alternatingly secured to both connection flanges via circumferentially distributed attachment and clamping means, and wherein said annular disk has four attachment holes uniformly distributed on a common hole circle, and the width of said annular disk tapers between two consecutive attachment holes, wherein the taper between two adjacent attachment holes is defined by a recess with a central, straight outer contour section and an inner contour section running parallel thereto, wherein said inner contour sections are continuously connected with each other via groove sections having a circular arc profile, while said straight outer contour sections pass over into outer contour sections having also a circular arc profile, and wherein said circular arc profiles have the same circular arc radius, characterized by the fact that the annular disk satisfies the following size ratios:

$Dt/D1$=10 to 12, $D2/Dt$=1.1 to 1.2, $Dt/B1$=9 to 16, $B2/Dt$=0.88 to 0.93, and $Dt/D3$=1.5 to 1.65, wherein Dt is a diameter of said hole circle, D1 is a diameter of the respective attachment hole, D2 is a largest outside diameter of said annular disk, B1 is a width of a narrowest part of said annular disk section between two consecutive attachment holes, B2 is a width of said annular disk outer contour, and D3 is a smallest inside diameter of said annular disk.

6. A disk packet according to claim 5, wherein plain washers are arranged between individual annular disks or between packets comprised of several annular disks.

7. A disk packet according to claim 6, wherein said plain washers consist of plastic, or have a plastic coating.

8. A disk packet according to claim 6, wherein said plain washers consist of polytetrafluoroethylene, or have a coating made out of polytetrafluoroethylene.

9. An annular disk for flexible shaft couplings, whose two coupling halves, each having a connection flange, are connected to each other via a packet of said annular disks in a torsionally rigid manner, but in such a way as to enable their axial and angular movement, wherein the disk packet is alternatingly secured to both connection flanges via circumferentially distributed attachment and clamping means, and wherein said annular disk has four attachment holes uniformly distributed on a common hole circle, and the width of said annular disk tapers between two consecutive attachment holes, wherein the taper between two adjacent attachment holes is defined by an outer recess with a central, straight outer contour section and an inner contour section running parallel thereto, wherein said inner contour sections are connected via two straight but angled inner contour sections with a next inner contour section defining a narrowest part of said annular disk section between two consecutive attachment holes, characterized by the fact that the annular disk satisfies the following size ratios:

$Dt/D1$=10 to 12, $D2/Dt$=1.1 to 1.2, $Dt/B1$=9 to 16, and $B2/Dt$=0.88 to 0.93, wherein Dt is a diameter of said hole circle, D1 is a diameter of the respective attachment hole, D2 is a largest outside diameter of said annular disk, B1 is a width of said narrowest part of said annular disk section between two consecutive attachment holes, and B2 is a width of said annular disk outer contour.

10. A disk packet according to claim 9, wherein plain washers are arranged between individual annular disks or between packets comprised of several annular disks.

11. A disk packet according to claim 10, wherein said plain washers consist of plastic, or have a plastic coating.

12. A disk packet according to claim 10, wherein said plain washers consist of polytetrafluoroethylene, or have a coating made out of polytetrafluoroethylene.

13. An annular disk for flexible shaft couplings, whose two coupling halves, each having a connection flange, are connected to each other via a packet of said annular disks in a torsionally rigid manner, but in such a way as to enable their axial and angular movement, wherein the disk packet is alternatingly secured to both connection flanges via circumferentially distributed attachment and clamping means, and wherein said annular disk has four attachment holes uniformly distributed on a common hole circle, and the width of said annular disk tapers between two consecutive attachment holes, wherein the taper between two adjacent attachment holes is defined by an outer recess with a central, straight outer contour section and an inner contour section running parallel thereto, and wherein said inner contour sections are connected via two straight, but angled inner contour sections with a next inner contour section defining a narrowest part of said annular disk section between two consecutive attachment holes, characterized by the fact that the annular disk satisfies the following size ratios:

$Dt/D1$=10 to 12, $D2/Dt$=1.1 to 1.2, $Dt/B1$=9 to 16, $B2/Dt$=0.88 to 0.93, and $Dt/D3$=1.5 to 1.65, wherein Dt is a diameter of said hole circle, D1 is a diameter of the respective attachment hole, D2 is a largest outside diameter of said annular disk, B1 is a width of said narrowest part of said annular disk section between two consecutive attachment holes, B2 is a width of said annular disk outer contour, and D3 is a smallest inside diameter of said annular disk.

14. A disk packet according to claim 13, wherein plain washers are arranged between individual annular disks or between packets comprised of several annular disks.

15. A disk packet according to claim 14, wherein said plain washers consist of plastic, or have a plastic coating.

16. A disk packet according to claim 14, wherein said plain washers consist of polytetrafluoroethylene, or have a coating made out of polytetrafluoroethylene.

* * * * *

UNITED STATES PATENT AND TRADEMARK OFFICE
CERTIFICATE OF CORRECTION

PATENT NO. : 6,699,133 B2
DATED : March 2, 2004
INVENTOR(S) : Kropp et al.

It is certified that error appears in the above-identified patent and that said Letters Patent is hereby corrected as shown below:

Title page,
Item [30], Foreign Application Priority Data, should read:
-- Apr. 10, 2000  (DE).............100 17 512.0 --.

Signed and Sealed this

Sixth Day of July, 2004

JON W. DUDAS
*Acting Director of the United States Patent and Trademark Office*